(12) United States Patent
Romero et al.

(10) Patent No.: US 11,047,181 B2
(45) Date of Patent: *Jun. 29, 2021

(54) DIFFUSER ASSEMBLY

(71) Applicants: Cambre Allen Romero, St. Martinville, LA (US); Clayton Allen Romero, New Iberia, LA (US)

(72) Inventors: Cambre Allen Romero, St. Martinville, LA (US); Clayton Allen Romero, New Iberia, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,501

(22) Filed: May 11, 2020

(65) Prior Publication Data

US 2020/0270957 A1    Aug. 27, 2020

Related U.S. Application Data

(63) Continuation of application No. 16/105,556, filed on Aug. 20, 2018, now Pat. No. 10,648,256, which is a continuation-in-part of application No. 15/061,493, filed on Mar. 4, 2016, now Pat. No. 10,053,960.

(51) Int. Cl.
*E21B 21/00* (2006.01)
*E21B 31/03* (2006.01)
*E21B 37/04* (2006.01)
*E21B 43/08* (2006.01)
*E21B 31/00* (2006.01)

(52) U.S. Cl.
CPC ............ *E21B 21/003* (2013.01); *E21B 31/00* (2013.01); *E21B 31/03* (2013.01); *E21B 37/045* (2013.01); *E21B 43/086* (2013.01)

(58) Field of Classification Search
CPC ........ E21B 37/02; E21B 43/086; E21B 17/18; E21B 37/08; E21B 43/08; E21B 21/002; E21B 21/003; E21B 27/005; E21B 40/00; E21B 21/00
See application file for complete search history.

(56) References Cited

U.S. PATENT DOCUMENTS

| | | | | |
|---|---|---|---|---|
| 3,633,674 A | * | 1/1972 | Brieger | E21B 43/08 166/381 |
| 10,677,019 B2 | * | 6/2020 | Romero | E21B 37/02 |
| 2011/0114339 A1 | * | 5/2011 | Adamson | E21B 7/20 166/386 |

* cited by examiner

*Primary Examiner* — Kristyn A Hall
(74) *Attorney, Agent, or Firm* — Warner J. Delaune; Phelps Dunbar LLP

(57) ABSTRACT

A diffuser assembly is provided, comprising a diffuser adapted to reside within a conduit, having an upper member mountable within the conduit and having a fluid inlet port, and a lower section having a diffuser screen; a plurality of stationary diffusing members below the fluid inlet port, wherein the diffusing members are radially oriented relative to a central axis of the diffuser; and (c) a centralizing member above the diffuser screen having a diameter greater than the diffuser screen. The diffuser screen is a cylinder having a plurality of diffuser slots formed therein and a bottom cap having a fluid port; and each of the plurality of diffusing members extends substantially parallel to the central axis.

11 Claims, 19 Drawing Sheets

DIFFUSER ASSEMBLY

CROSS-REFERENCE TO RELATED APPLICATIONS

This application is a continuation of U.S. Ser. No. 16/105,556, filed on Aug. 20, 2018, which is a continuation-in-part of U.S. Ser. No. 15/061,493, filed on Mar. 4, 2016, now U.S. Pat. No. 10,053,960.

BACKGROUND OF THE INVENTION

1. Field of the Invention

The present invention relates in part to devices and methods used in oil and gas drilling operations to diffuse aggregations of lost circulation materials (LCM) which are used to resolve lost circulation and fluid losses, and more particularly to such devices which include elements for breaking down larger masses of LCM during the diffusion step.

2. Prior Art

When drilling oil and gas wells, under proper conditions during the drilling process, drilling fluids and drill cuttings are circulated away from the drill bit into the annulus around the drill stem and brought to the surface. Such drilling fluids are also important for providing hydrostatic pressure to prevent formation fluids from entering into the well bore, keeping the drill bit cool and clean during drilling, and suspending the drill cuttings while drilling is paused and when the drilling assembly is brought in and out of the hole. Because proper circulation is critical to the drilling process, any lost circulation is a significant problem that must be overcome for drilling to recommence.

Lost circulation is the partial or complete loss of drilling fluid or cement slurry to the formation during drilling or cementing operations or both. Lost circulation can be brought on by natural causes, such as naturally fractured formations or unconsolidated zones, or induced causes, such as when the hydrostatic fluid column pressure exceeds the fracture gradient of the formation and the formation pores break down enough to receive (rather than resist) the fluid. When lost circulation occurs, it typically results in the new expenditure of time and mud or cement, adding substantially to the overall cost of a well.

The consequences of lost circulation can be as little as the loss of a few dollars of drilling fluid, or as disastrous as a blowout and loss of life. If the amount of fluid in the well bore drops due to lost circulation (or any other reason), hydrostatic pressure is reduced, which can allow a gas or fluid which is under a higher pressure than the reduced hydrostatic pressure to flow into the well bore. Another consequence of lost circulation is dry drilling. Dry drilling occurs when fluid is completely lost from the well bore without actual drilling coming to a stop. The effects of dry drilling range from as minor as destroying a bit to as serious as major damage to the well bore requiring a new well to be drilled. Dry drilling can also cause severe damage to the drill string, including snapping the pipe, and the drilling rig itself.

Lost circulation material (LCM) is the collective term for substances added to drilling fluids when drilling fluids are being lost to the formations downhole. Commonly used LCM types include fibrous (cedar bark, shredded cane stalks, mineral fiber and hair), flaky (mica flakes and pieces of plastic or cellophane sheeting) or granular (ground and sized limestone or marble, wood, nut hulls, Formica, corncobs and cotton hulls). The LCM, in combination with other fluids with increased viscosity, are used to fill fractures and heal the loss zone quickly.

As the LCM is delivered to the loss zone, accumulations and aggregations of the LCM can occur which may obstruct the necessary flow of fluids to the site. Therefore, it is desirable to prevent such obstructions by diffusing such aggregations or "clumps" as early and as quickly as possible. Given the nature of some types of LCM and their tendency to aggregate into such clumps, one solution is to cause such clumps to contact blades or cutters placed into the fluid path, but while not substantially decreasing the proper fluid flow during the healing process of the loss zone.

In addition to diffusion near the loss zone, there is also a need for diffusion of LCM clumps that form as the fluids are delivered through the drill pipe at the rig floor, as well as diffusion of LCM clumps which may form after leaving the mixing tank where the LCM is added to the drilling fluids. Furthermore, once drilling operations are concluded, the diffuser can also be deployed in various locations for LCM diffusion in completion and workover operations.

SUMMARY OF THE INVENTION

Therefore, it is an object of the present invention to provide a diffuser assembly, comprising a diffuser adapted to reside within a conduit, having an upper mounting member mountable within the conduit and having an fluid inlet port, and a lower section having a diffuser screen; and a plurality of diffusing members radially oriented relative to a central axis of the diffuser.

Another object of the present invention is to provide a diffuser assembly, wherein the diffuser screen is a cylinder having a plurality of diffuser slots formed therein and a bottom cap having a fluid port.

Another object of the present invention is to provide a diffuser assembly, wherein each of the plurality of diffusing members includes a diffusing edge.

Another object of the present invention is to provide a diffuser assembly, wherein a first set of diffusing members is mounted at a first selected height along the central axis of the diffuser screen, and wherein a second set of diffusing members is mounted at a second selected height along the central axis of the diffuser screen. The diffusing members may be mounted to the diffuser screen such that the diffusing edges are either internal or external to the diffuser screen.

Yet another object of the present invention is to provide a diffuser assembly, which further includes a plurality of centralizing members adjacent to the diffuser screen.

Another object of the present invention is to provide a diffuser assembly that can be positioned in different locations, including within a downhole carrier sub inside a well bore, within a drill pipe at the rig floor, or within a conduit in fluid communication between a mixing tank and a pump.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Figure 1:
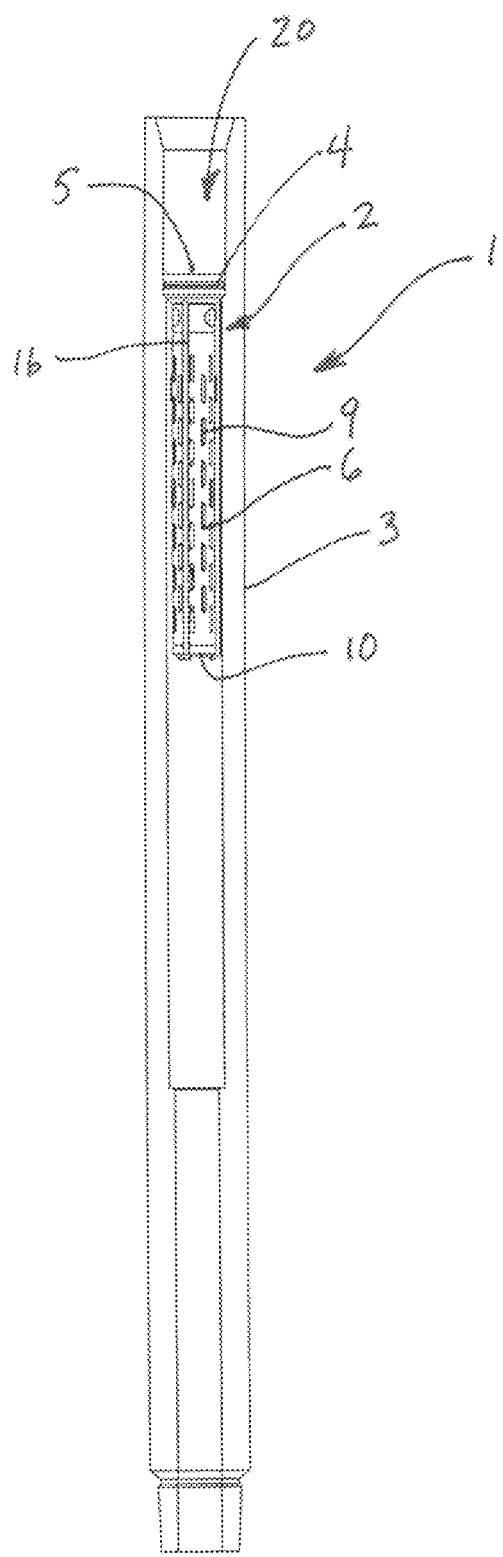
FIG. 1 shows a side sectional view of a carrier sub, such as a stabilizer or other type of downhole sub, containing a preferred embodiment of a diffuser screen of the present invention.
Figure 2:
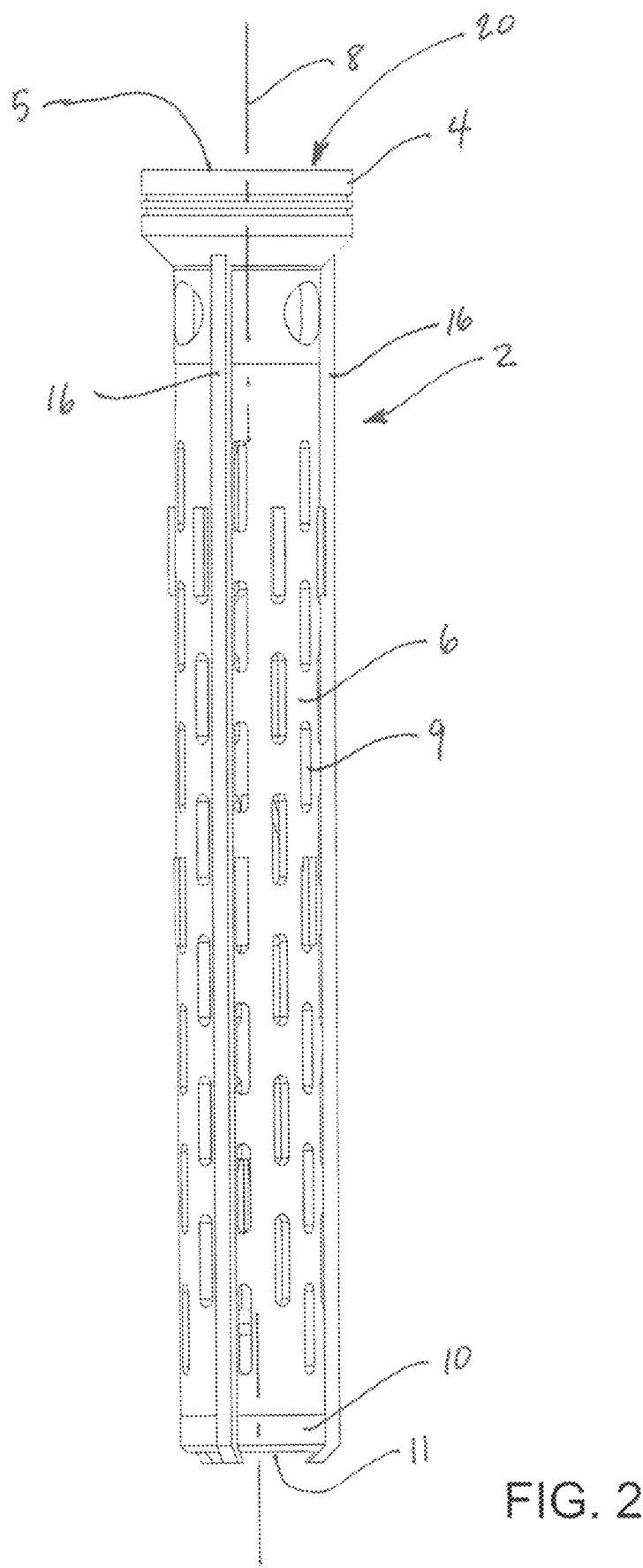
FIG. 2 shows a side view of the diffuser screen of FIG. 1.
Figure 3:
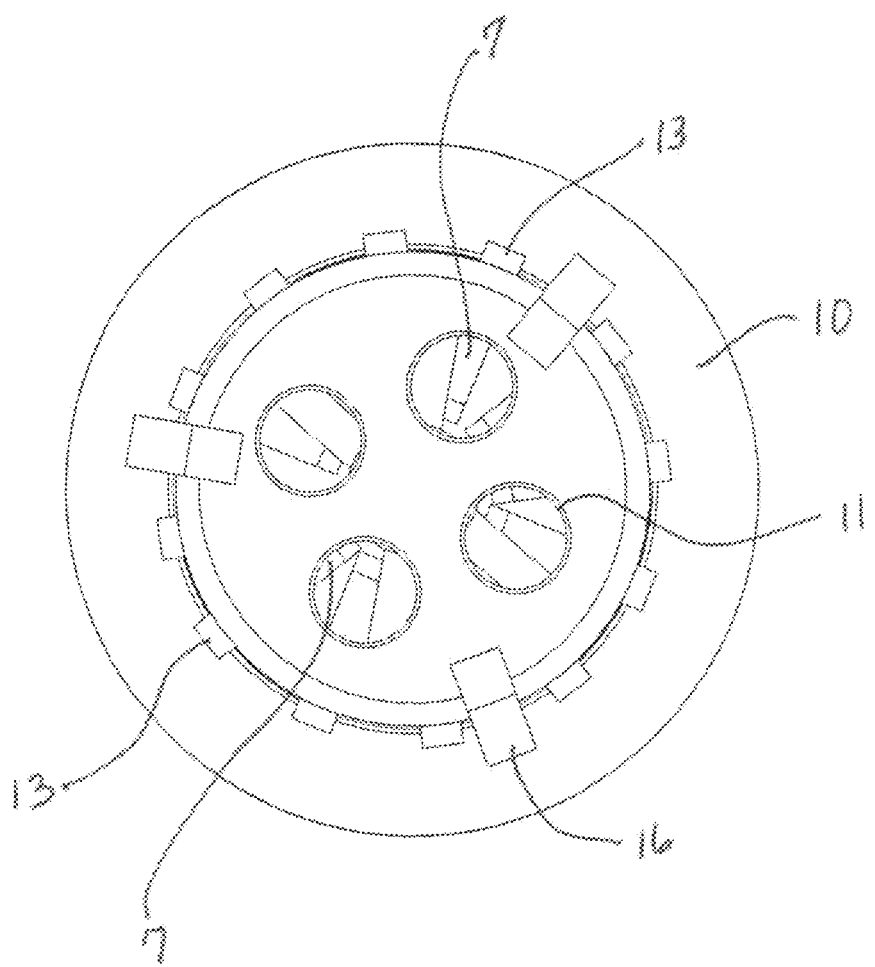
FIG. 3 shows a bottom view of the diffuser screen of FIG. 1.
Figure 4:
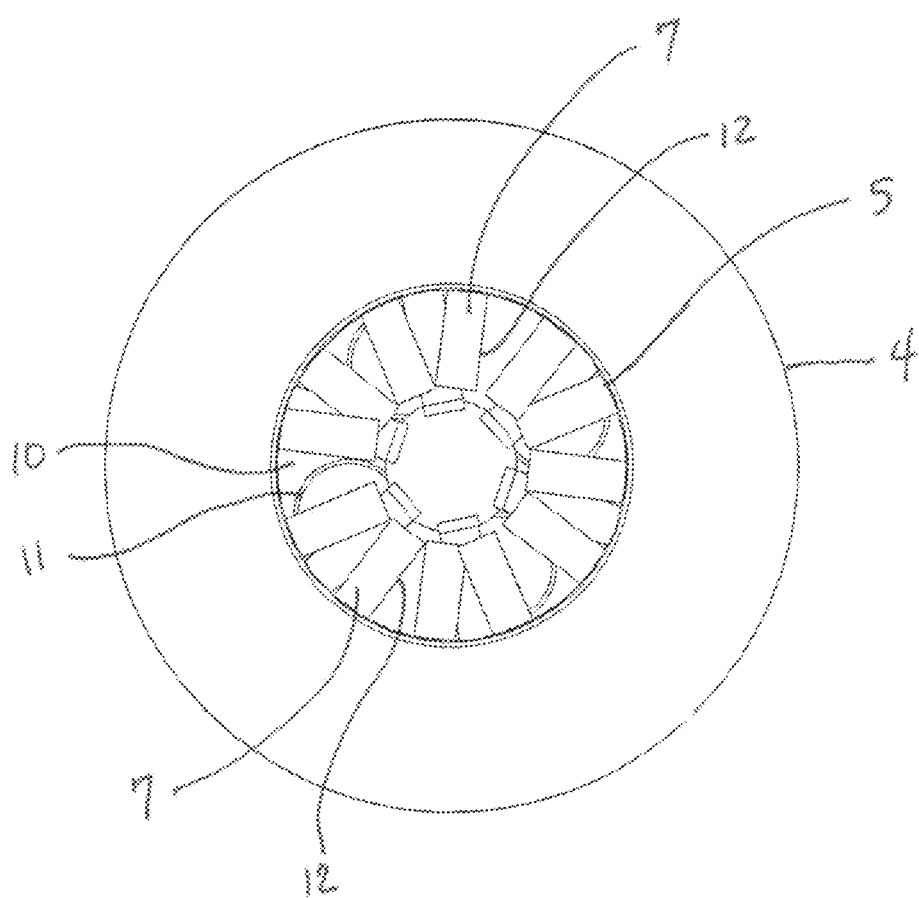
FIG. 4 shows a top view of the diffuser screen of FIG. 1.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs. Unless otherwise specified herein, all materials of construction are preferably steel resistant to the corrosive effects common in oil and gas production environments. As used herein the term "conduit" shall mean any tubular member into which the diffuser 1 can be installed for the purpose of allowing LCM-containing fluid to flow through the conduit and be broken apart, or diffused, by the diffuser 1. Non-limiting examples of conduits may be a carrier sub, drill pipe, stabilizer, or other tubular member such as shown in the figures.

Turning now to the figures, a preferred embodiment of the present invention is shown in FIGS. 1-6 as a diffuser assembly 1 comprising a diffuser 2 adapted to reside within a conduit in the form of a carrier sub 3, having an upper mounting member 4 mountable within the carrier sub 3 and having an fluid inlet port 5, and a lower section having a diffuser screen 6. As shown in more detail in FIGS. 4 and 6, a plurality of cutters 7 are removably attached to the diffuser screen 6, wherein the cutters 7 are radially oriented relative to a central axis 8 of the diffuser screen 6. The diffuser screen 6 is a cylinder having a plurality of diffuser slots 9 formed therein and a bottom cap 10 having a fluid port 11.

In the embodiment shown in FIGS. 1-6, the diffuser assembly 1 further includes a plurality of centralizing members 16 adjacent to the diffuser screen 6, wherein each of the centralizing members 16 extends between the mounting member 4 and the bottom cap 10. The three centralizing members 16 serve to keep the diffuser screen 6 centered within the carrier sub 3. It should be understood that the centralizing members 16 can take a wide range of structural forms which accomplish the purpose of centering the diffuser screen 6 within the carrier sub 3.

Figure 5:
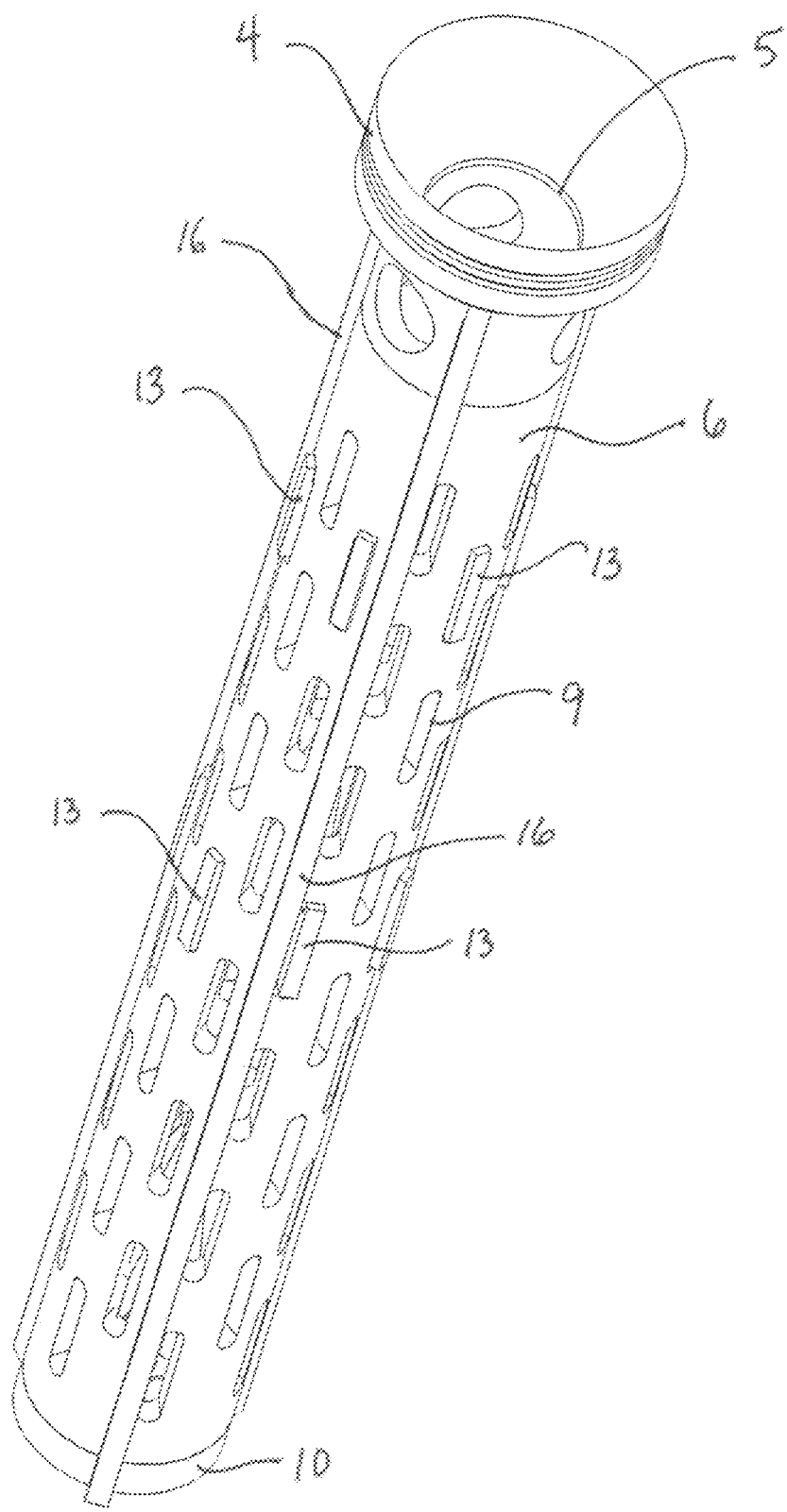
FIG. 5 shows a perspective view of the diffuser screen of FIG. 1 depicting the screening cylinder having internal cutters.
Figure 6:
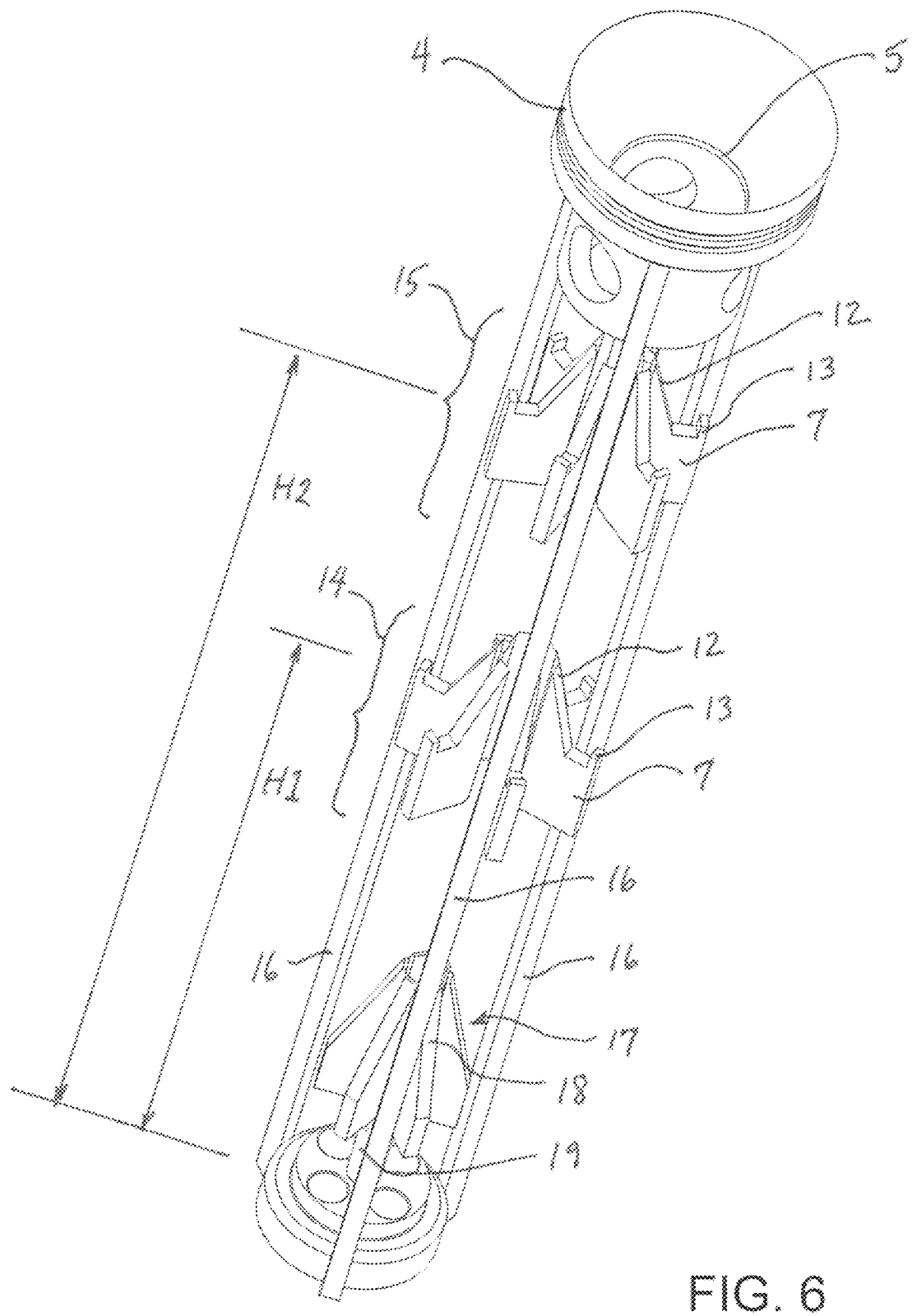
FIG. 6 shows a perspective view of the diffuser screen of FIG. 1 without the screening cylinder to better depict the placement of the internal cutters.
Figure 7:
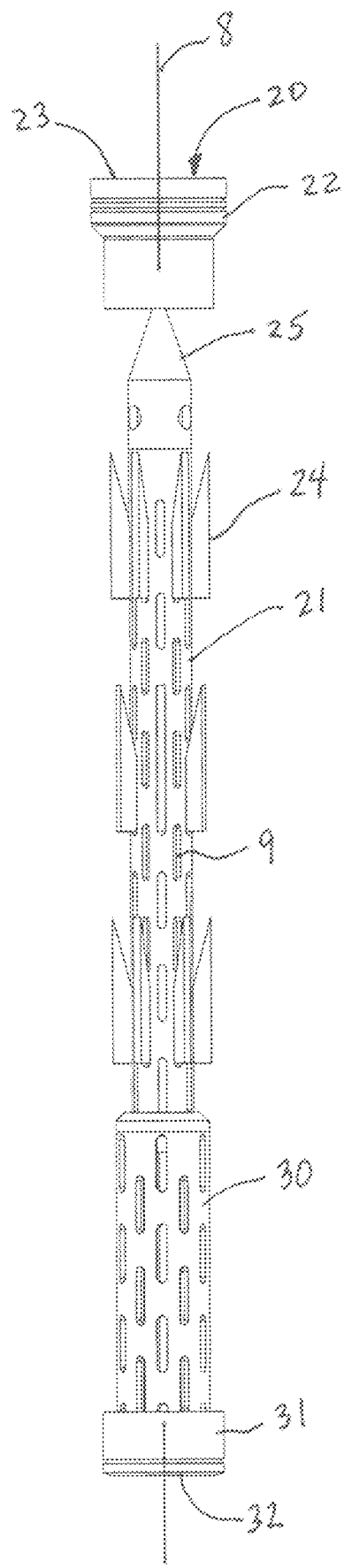
FIG. 7 shows an alternate embodiment of the diffuser screen having external cutters and a lower slotted screening cylinder.
Figure 8:
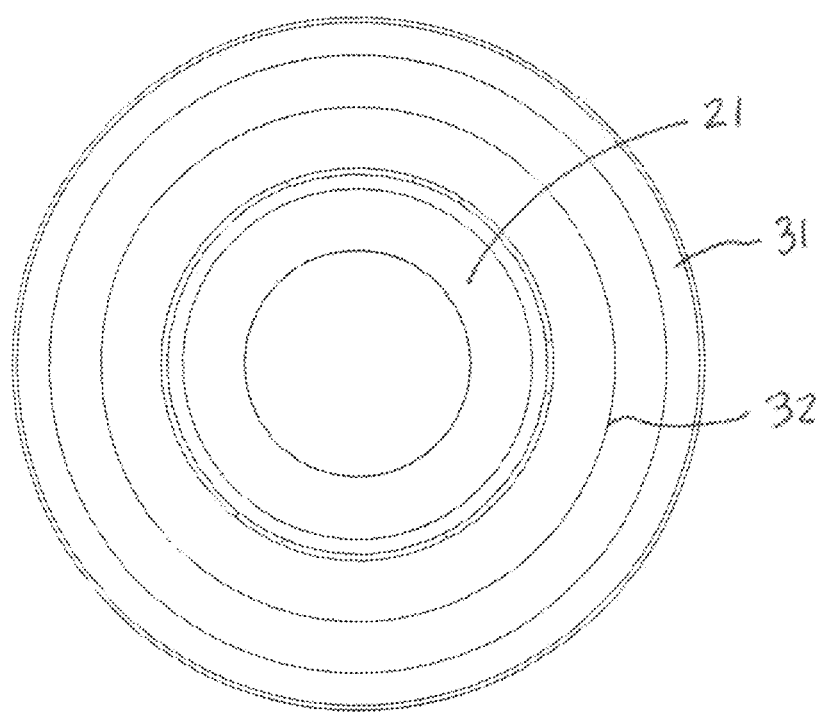
FIG. 8 shows a bottom view of the diffuser screen of FIG. 7.
Figure 9:
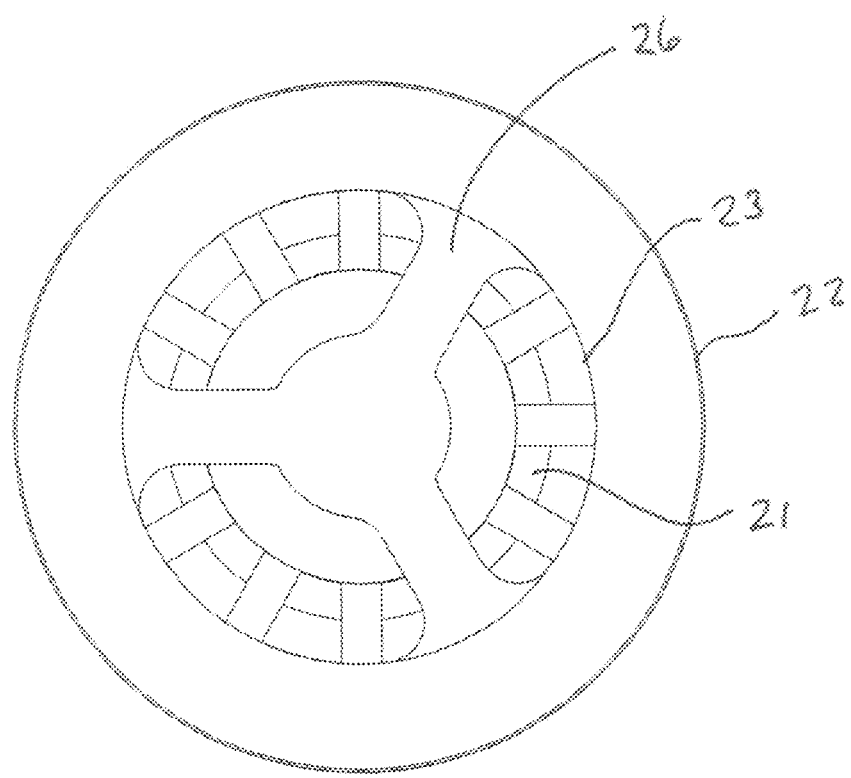
FIG. 9 shows a top view of the diffuser screen of FIG. 7.
Figure 10:
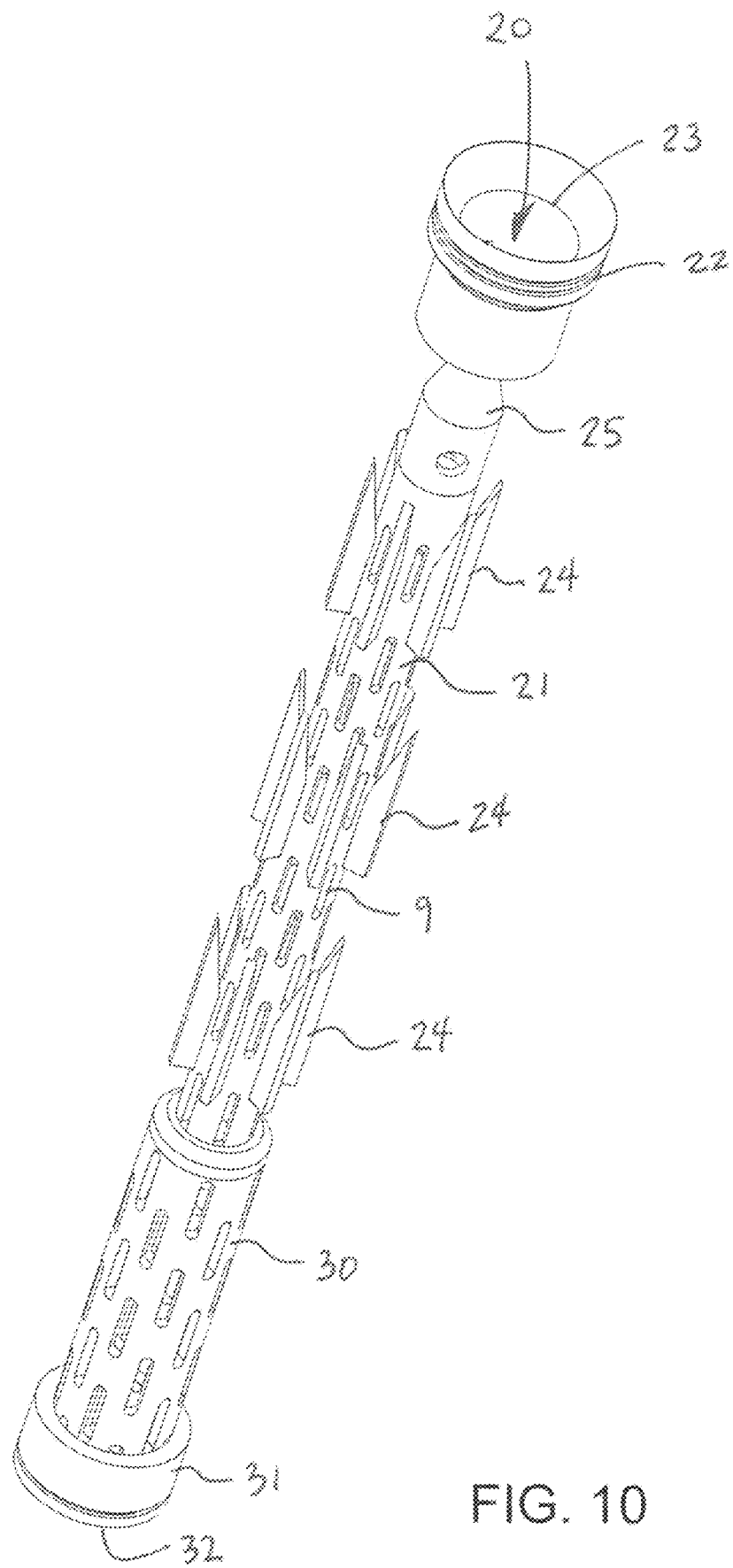
FIG. 10 shows a perspective view of the diffuser screen of FIG. 7 depicting the screening cylinder having external cutters.

As shown best in FIG. 6, with the cylindrical diffuser screen 6 removed for clarity, each of the plurality of cutters 7 includes a cutting edge 12 and a mounting flange 13, and wherein the mounting flange 13 is adapted to matably engage one of the plurality of diffuser slots 9 of the diffuser screen 6. In a preferred embodiment, a first set 14 of cutters 7 is mounted at a first selected height H1 along the central axis 8 of the diffuser screen 6, and a second set 15 of cutters 7 is mounted at a second selected height H2 along the central axis 8 of the diffuser screen 6. In this embodiment shown in FIGS. 1-6, the cutters 7 are mounted to the diffuser screen 6 such that the cutting edges 12 are internal to the diffuser screen 6. It should be understood that each individual cutter 7 may reside in any slot 9 to provide a varied and irregular pattern of cutters 7 on the diffuser screen 6. However, it is believed that having organized sets of cutters 7 at selected heights may provide more consistent separation of LCM aggregations during the diffusion of the fluid through the diffuser assembly 1.

As best shown in FIG. 6, the diffuser assembly 1 further includes a bottom diffusing device 17 extending from a post 19 affixed to the bottom cap 10 internal to the diffuser screen 6, wherein the bottom diffusing device 17 includes a plurality of radially disposed cutting edges 18 similar to the cutters 7 positioned above the cutting device 17. The bottom diffusing device 17 essentially serves as a third stage cutting step in addition to the first and second set 14, 15 of cutters 7, prior to the fluid 20 exiting the diffuser screen 6 through fluid port 11.

In an operational configuration, fluid 20 flows through the carrier sub 3, such as a stabilizer or other type of downhole sub, and into the inlet port 5 of the mounting member 4. Any LCM aggregations or clumps in the fluid 20 pass against the cutting edges 12 of cutters 7, and are separated into smaller portions to collect within the diffuser screen 6, while the fluid 20 can exit the diffuser screen 6 through diffuser slots 9 and the fluid port 11.

The preferred embodiment described above, as well as the alternate embodiments described below, are effective for diffusion of a wide range of fluids and materials, including oil and water based muds, barite drilling muds, cement, all drilling fluids, spotting acids for break-up of limestone formations, blended materials mixed in blending tanks, breakup of larger masses of carbide bombs, and any other "cake balls" mud clumps, LCM, cement, and the like that form in the string or from poor blending.

In an alternate embodiment shown in FIGS. 7-11, a similar diffuser assembly is configured to allow the flow of fluid 20 such that LCM aggregations are caused to contact cutters 24 positioned external to the diffuser screen 21, and where LCM too large for the diffuser slots 9 is collected on the outside of the diffuser screen 21. A mounting member 22 (similar to mounting member 4) includes an inlet port 23 for entry of fluids 20. The fluid 20 is then diverted by a cone-shaped diversion member 25 attached to a bridge 26 inside mounting member 22 and disposed between the fluid inlet port 23 of the mounting member 22 and the diffuser screen 21.

Figure 11:
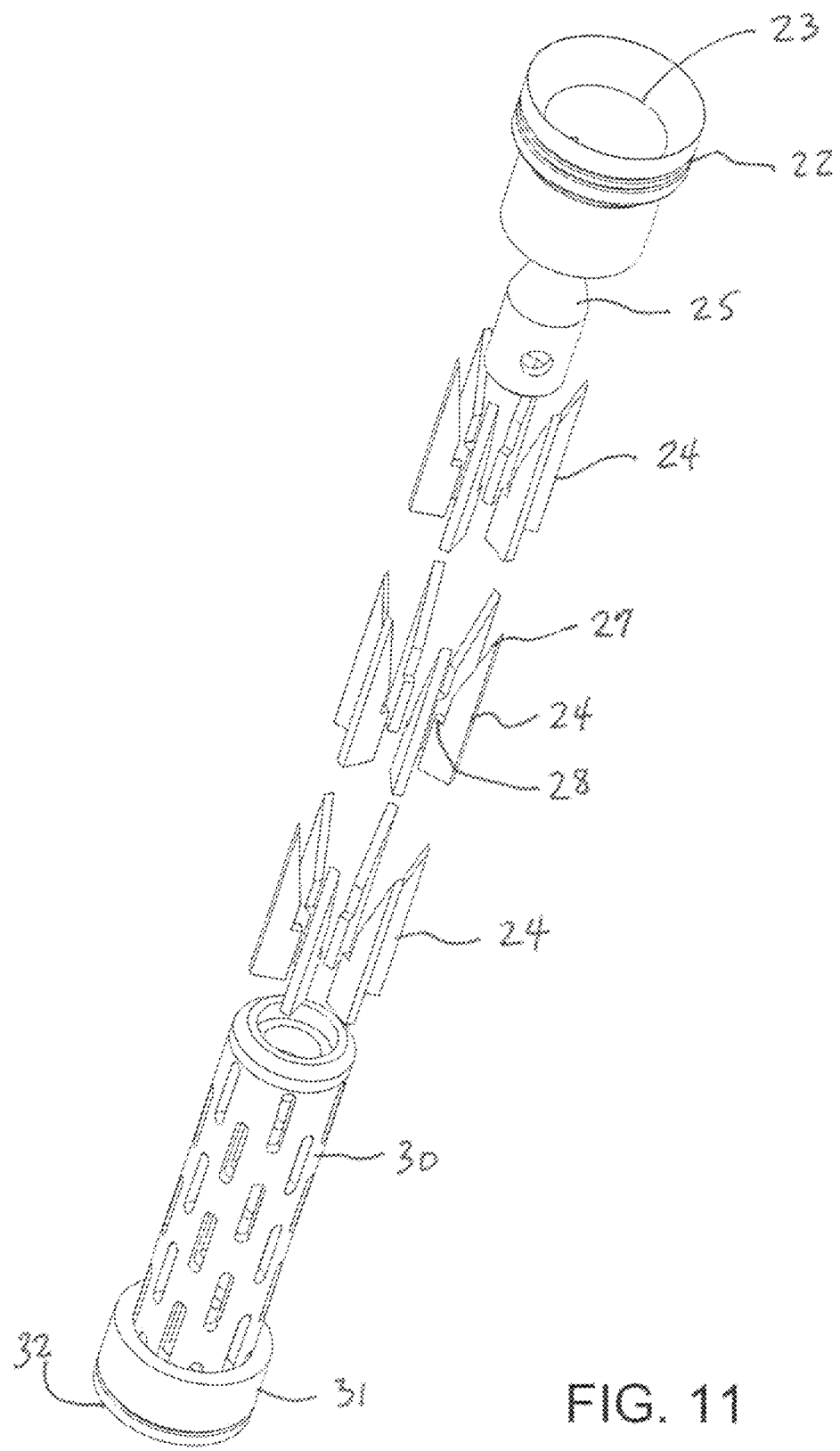
FIG. 11 shows a perspective view of the diffuser screen of FIG. 7 without the screening cylinder to better depict the placement of the external cutters.
Figure 12:
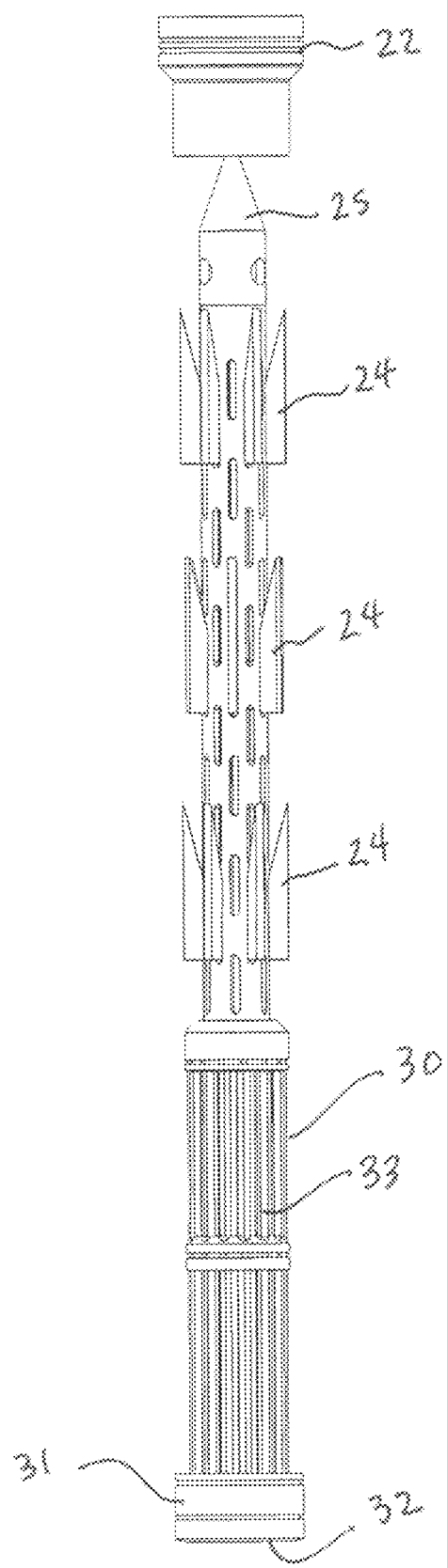
FIG. 12 shows a further alternate embodiment of the diffuser screen having external cutters and a lower screening constructed from vertical rods.
Figure 13:
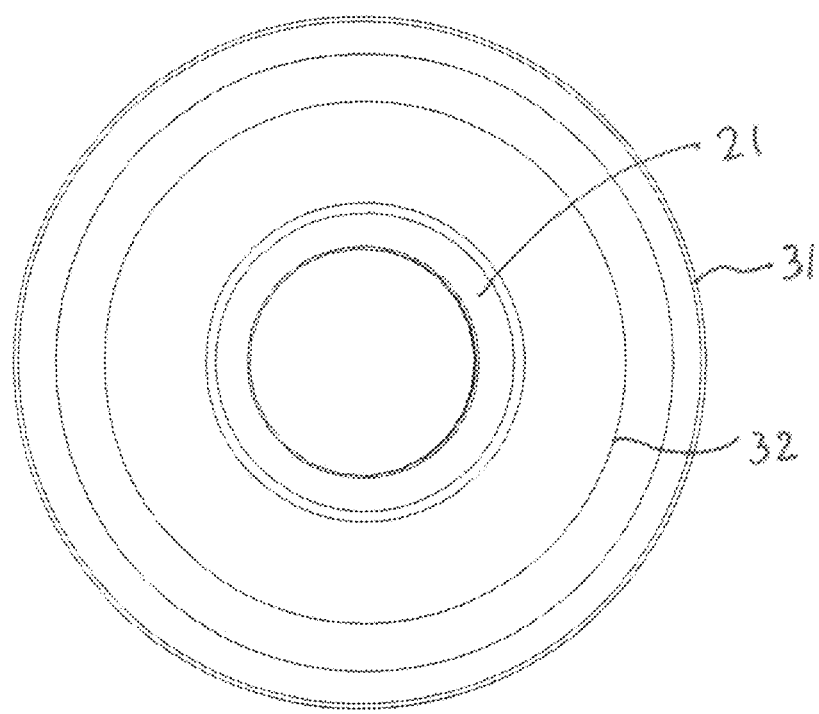
FIG. 13 shows a bottom view of the diffuser screen of FIG. 12.
Figure 14:
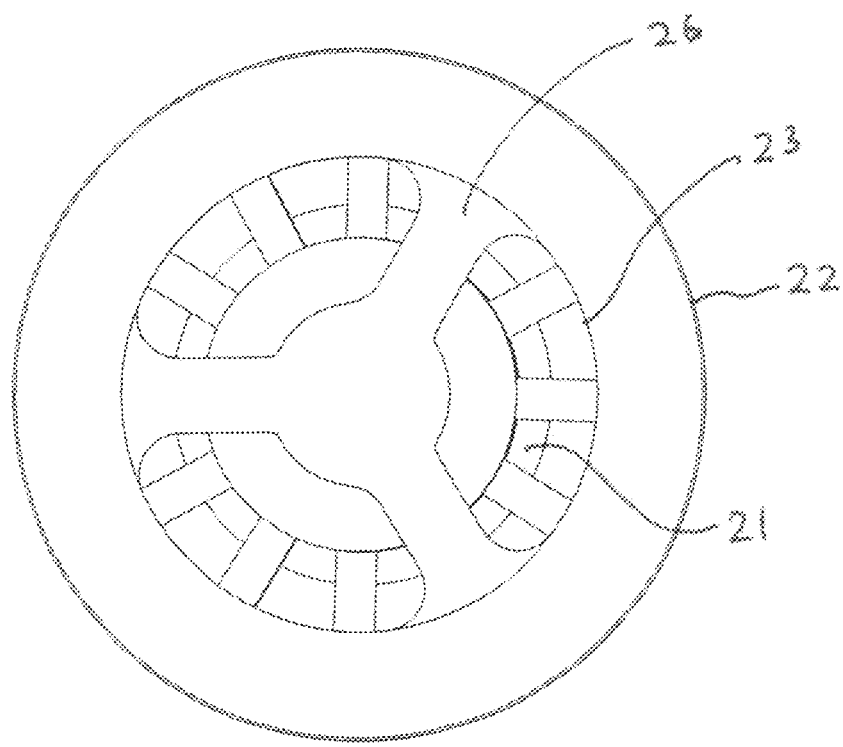
FIG. 14 shows a top view of the diffuser screen of FIG. 12.
Figure 15:
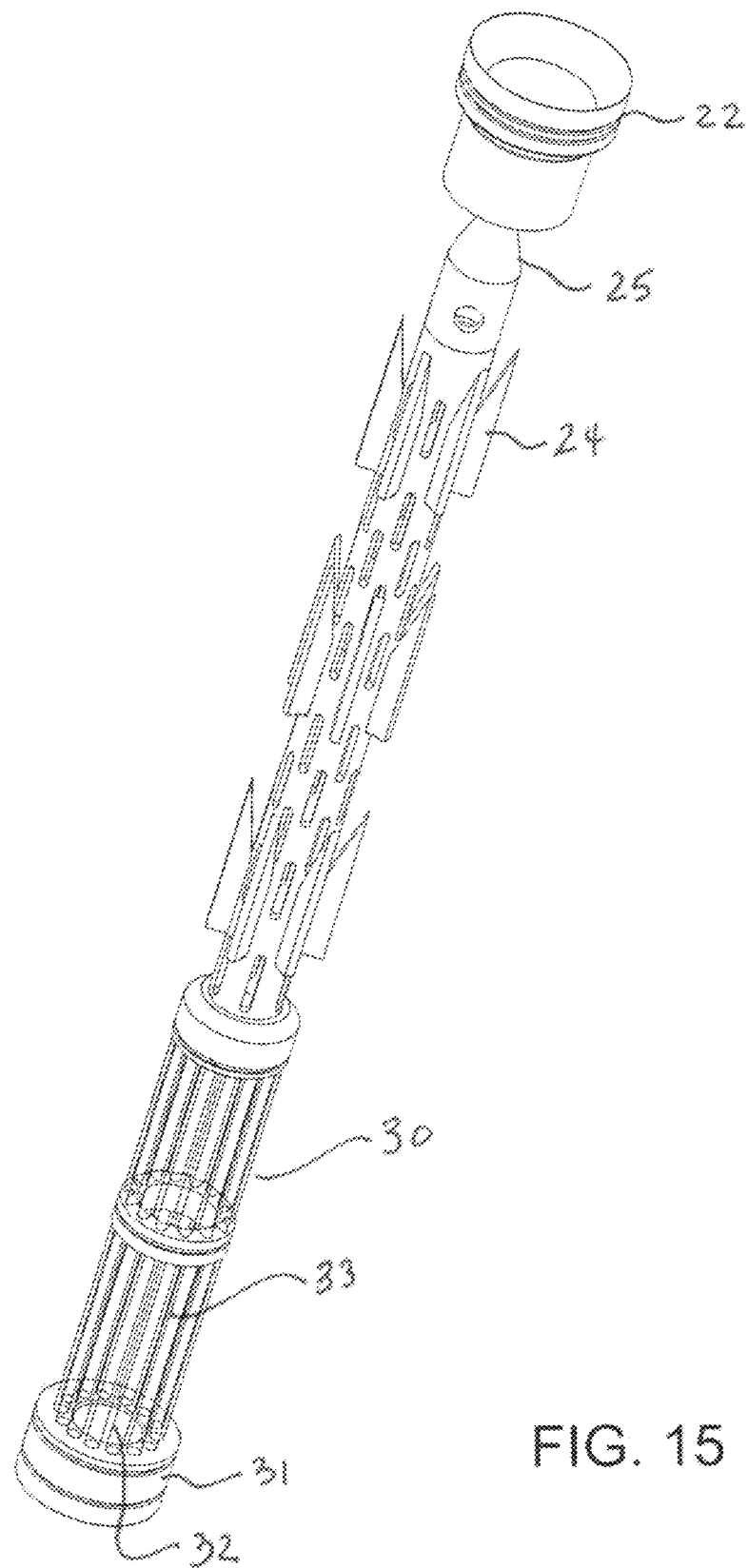
FIG. 15 shows a perspective view of the diffuser screen of FIG. 12 depicting the screening cylinder having external cutters.
Figure 16:
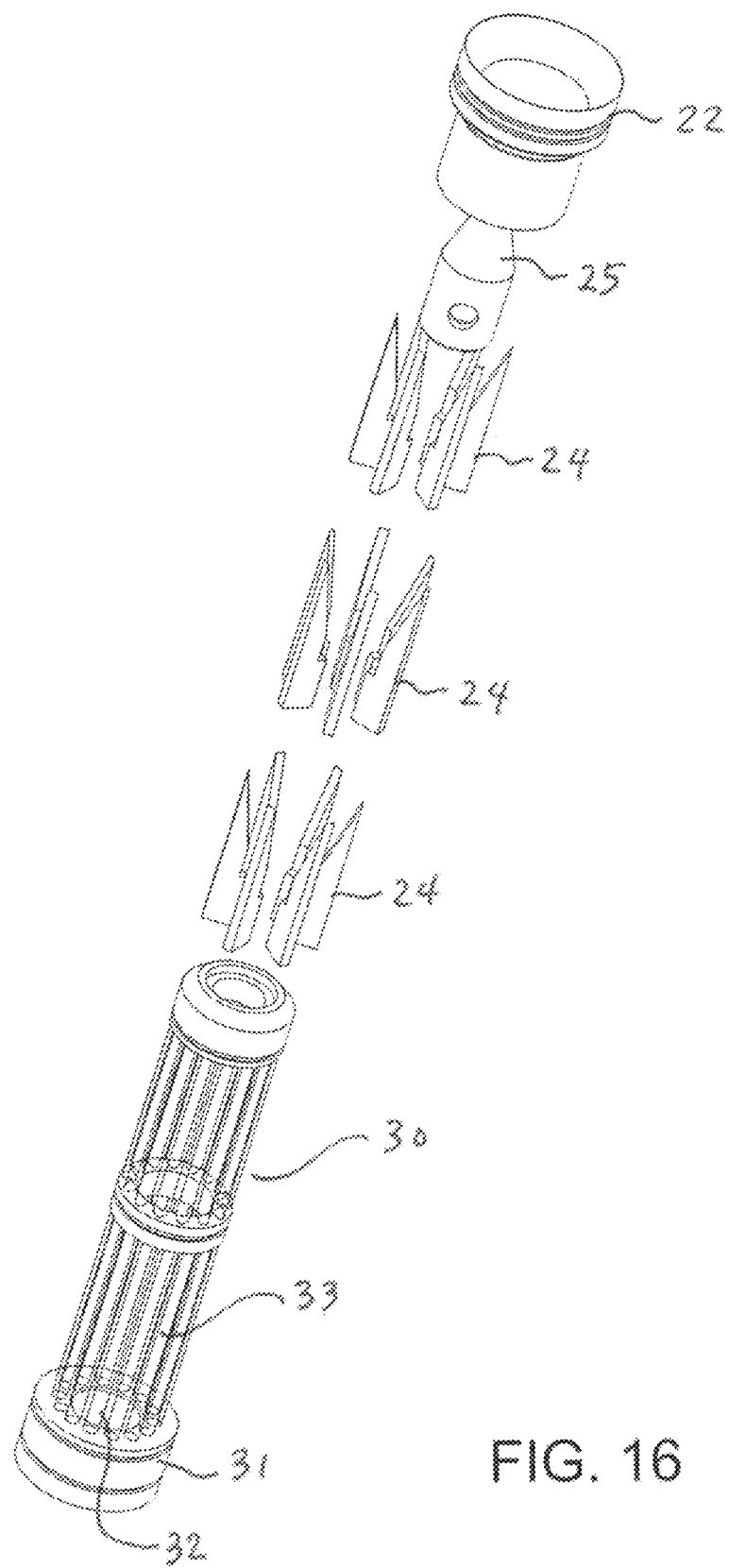
FIG. 16 shows a perspective view of the diffuser screen of FIG. 12 without the screening cylinder to better depict the placement of the external cutters.

As shown best in FIG. 11, with the cylindrical diffuser screen 21 removed for clarity, each of the plurality of cutters 24 includes a cutting edge 27 and a mounting flange 28, and wherein the mounting flange 28 is adapted to matably engage one of the plurality of diffuser slots 9 of the diffuser screen 21. In this embodiment, three sets of cutters 7 are mounted at selected heights along the central axis 8 of the diffuser screen 21, similar to the arrangement seen in FIG. 6.

As shown in FIGS. 7-11, the diffuser assembly 1 further includes a lower diffuser element 30 attached below the diffuser screen 21, wherein the lower diffuser element 30 is constructed from a slotted cylinder. A bottom cap 31 is attached to the bottom of lower diffuser element 30, and which includes a fluid exit port 32. A further embodiment is shown in FIGS. 12-16 that is identical to the embodiment of FIGS. 7-11, except for the lower diffuser element 30, which is constructed from vertical rods 33.

Figure 17:
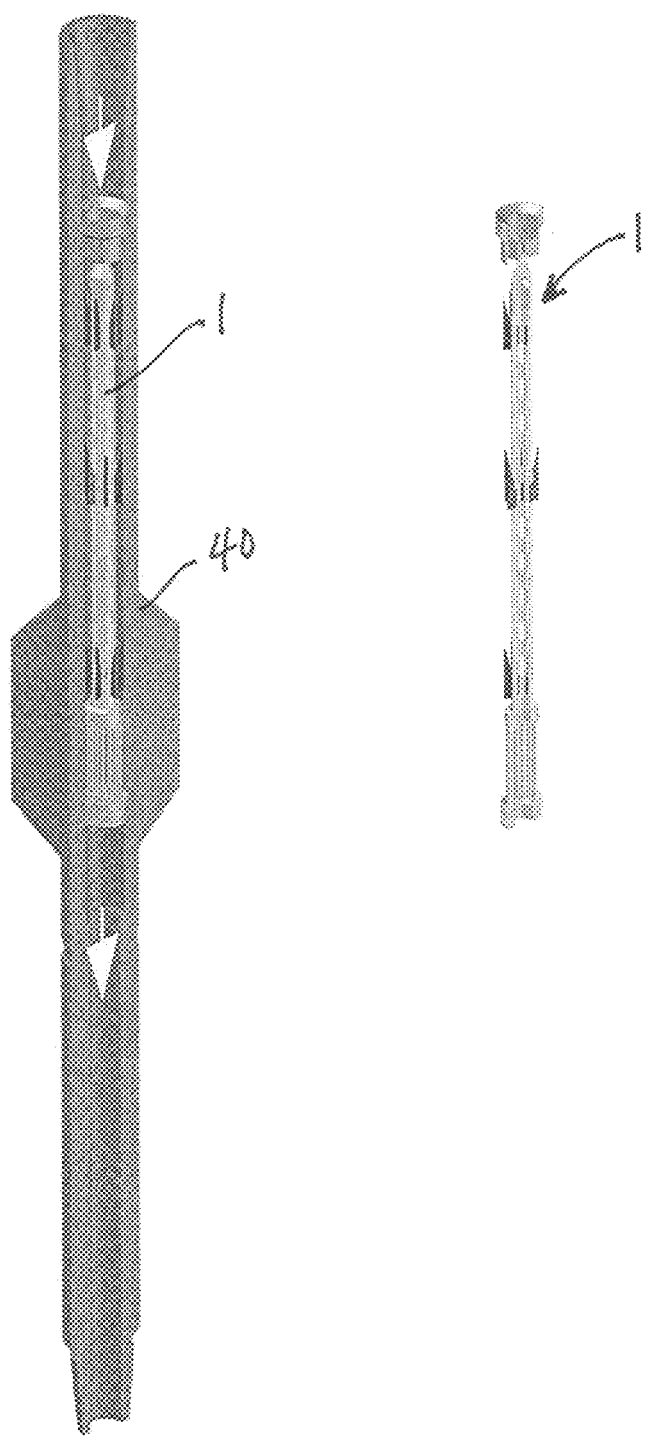
FIG. 17 shows the diffuser deployed within a stabilizer.

As shown in FIG. 17, the diffuser assembly 1 is deployed within another type of conduit in the form of a stabilizer 40, which supports the bottom hole assembly (BHA) in the well bore in order to avoid unintentional sidetracking or vibrations, and ensures the quality of the hole being drilled.

Figure 18A:
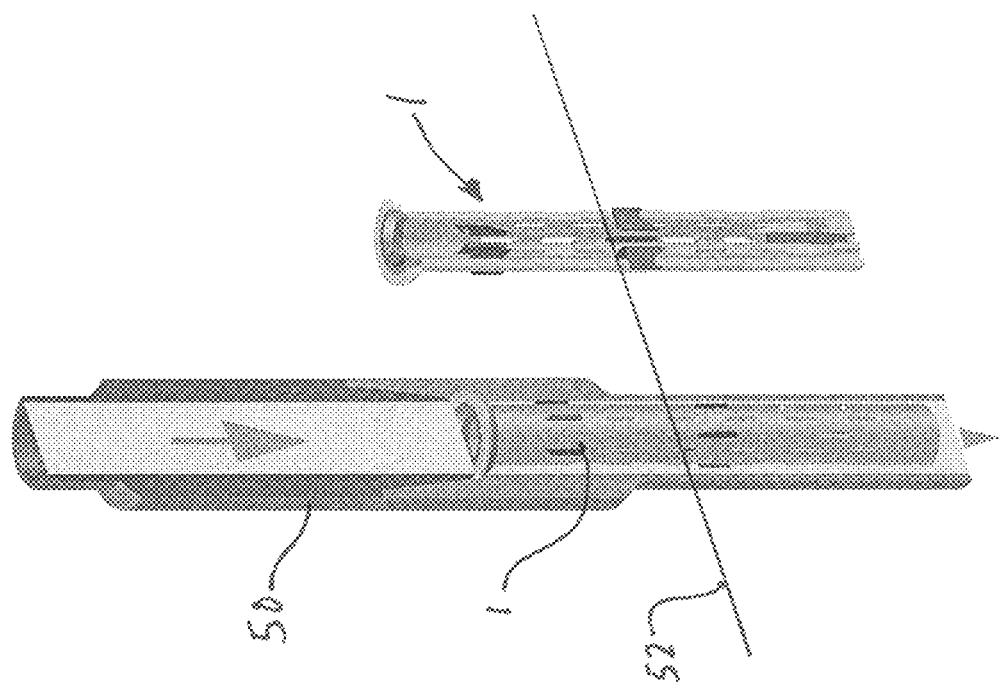
FIGS. 18A and 18B show retrievable and nonretrievable diffusers deployed within a section of drill pipe at the rig floor.
Figure 18B:
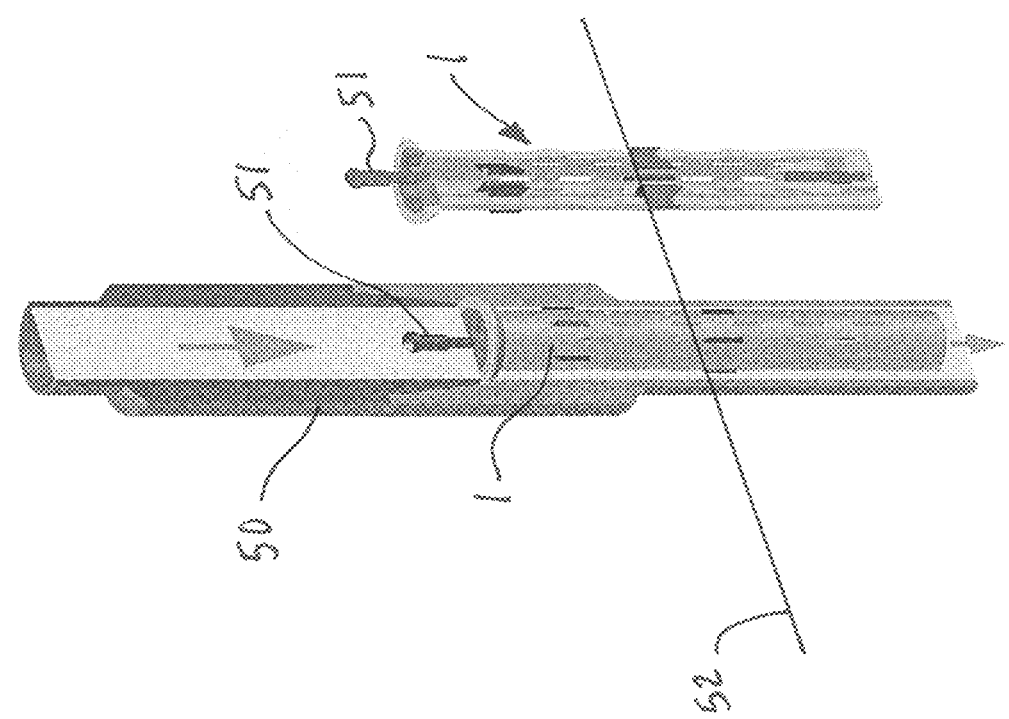

As shown in FIGS. 18A and 18B, the diffuser assembly 1 is deployed within a section of drill pipe 50 at the level of the rig floor 52. Note that in FIG. 18A, the diffuser screen 6 includes a retrievable neck 51, as is common in the art, that enables retrieval of the diffuser by conventional fishing tools. FIG. 18B includes an opening as shown in FIG. 5 and elsewhere herein. In this operation, the diffuser 1 is installed in the drill pipe 51 while drilling fluids containing LCM are pumped into the well bore during drilling. As the drill string moves deeper into the well bore and another section of drill pipe 51 is needed, the diffuser 1 is removed, and the next section of drill pipe 51 is threaded onto the drill string at the rig floor 52. After the next section of drill pipe 51 is connected, the diffuser 1 is re-installed into the drill pipe 51, after which the drilling and fluid flow can be restarted. Thus, any clumps of LCM that enter into the drill pipe 51 are diffused by the diffuser 1.

Figure 19:
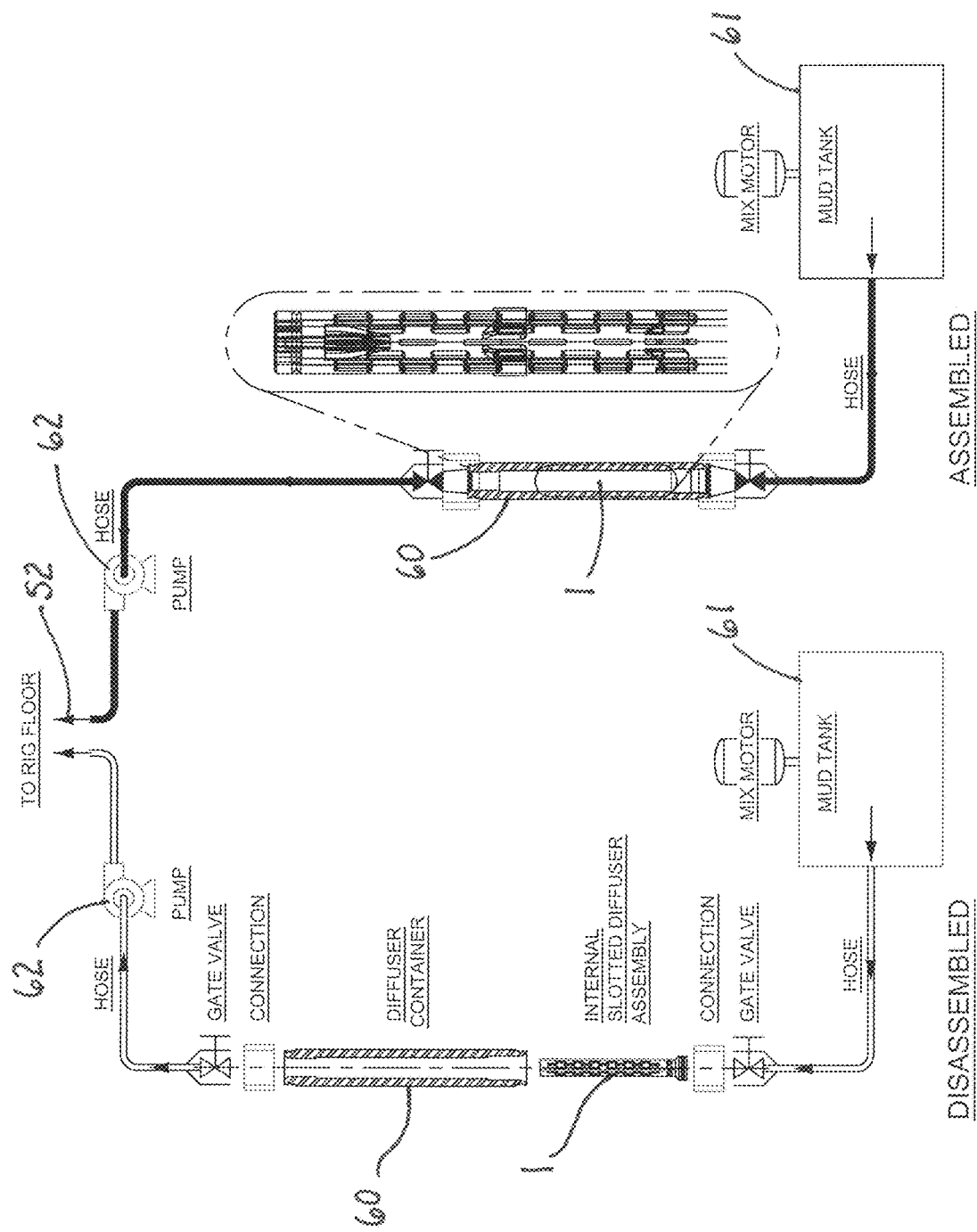
FIG. 19 shows the diffuser deployed within a conduit between a drilling fluid mixing tank and a pump.

As shown in FIG. 19, the diffuser 1 deployed within a conduit 60 between a drilling fluid mixing tank 61 and a pump 62 located in proximity to the rig floor 52. Tank 61 may be a fixed tank, or it may be a mobile tank located on a vehicle such as a truck or other vessel. The left side of FIG. 19 depicts the arrangement in a partial exploded view, while the right side of FIG. 19 depicts a fully assembled view with typical valves, hoses, and connectors to enable fluid flow from the mixing tank 61 to the rig floor 52. Thus, any clumps of LCM that exist when the fluid leaves the mixing tank 61 can be diffused by the diffuser 1 prior to being pumped to the rig floor 52.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A diffuser assembly, comprising:
   (a) a diffuser adapted to reside within a conduit, having an upper mounting member mountable within the conduit and having a fluid inlet port, and a lower section having a diffuser screen;
   (b) a plurality of stationary diffusing members below the fluid inlet port, wherein the diffusing members are radially oriented relative to a central axis of the diffuser; and
   (c) a plurality of centralizing members above the diffuser screen having a diameter greater than the diffuser screen; and
      wherein the diffuser screen is a cylinder having a plurality of diffuser slots formed therein and a bottom cap having a fluid port; and
      wherein each of the plurality of diffusing members extends substantially parallel to the central axis and includes a diffusing edge.

2. The diffuser assembly of claim 1, wherein a first set of diffusing members is mounted at a first selected height along the central axis of the diffuser screen, and wherein a second set of diffusing members is mounted at a second selected height along the central axis of the diffuser screen.

3. The diffuser assembly of claim 1, wherein the diffusing members are mounted to the diffuser screen such that the diffusing edges are internal to the diffuser screen.

4. The diffuser assembly of claim 3, wherein the plurality of centralizing members are adjacent to the diffuser screen.

5. The diffuser assembly of claim 4, wherein each of the plurality of centralizing members extends between the mounting member and the bottom cap.

6. The diffuser assembly of claim 3, further including a bottom diffusing device extending from the bottom cap internal to the diffuser screen, wherein the diffusing device includes a plurality of radially disposed diffusing edges.

7. The diffuser assembly of claim 1, wherein the diffusing members are mounted to the diffuser screen such that the diffusing edges are external to the diffuser screen.

8. The diffuser assembly of claim 7, further including a lower diffuser element below the diffuser screen, wherein the lower diffuser element is constructed from a slotted cylinder.

9. The diffuser assembly of claim 7, further including a lower diffuser element below the diffuser screen, wherein the lower diffuser element is constructed from vertical rods.

10. The diffuser assembly of claim 7, further including a diversion member disposed between the fluid inlet port of the mounting member and the diffuser screen.

11. The diffuser assembly of claim 1, wherein the diffuser assembly is positioned within a downhole carrier sub inside a well bore.

\* \* \* \* \*